US008312709B2

(12) United States Patent
Mueller et al.

(10) Patent No.: US 8,312,709 B2
(45) Date of Patent: Nov. 20, 2012

(54) METHOD FOR HEATING A CATALYTIC CONVERTER ARRANGED IN AN EXHAUST-GAS REGION OF A COMBUSTION PROCESS, AND DEVICE FOR CARRYING OUT THE METHOD

(75) Inventors: Norbert Mueller, Farmington Hills, MI (US); Guido Porten, Vaihingen/Enz (DE); Juergen Raimann, Weil der Stadt (DE); Klaus Winkler, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 709 days.

(21) Appl. No.: 12/514,997

(22) PCT Filed: Dec. 27, 2007

(86) PCT No.: PCT/EP2007/064586
§ 371 (c)(1),
(2), (4) Date: May 14, 2009

(87) PCT Pub. No.: WO2008/080952
PCT Pub. Date: Jul. 10, 2008

(65) Prior Publication Data
US 2010/0024392 A1 Feb. 4, 2010

(30) Foreign Application Priority Data

Dec. 28, 2006 (DE) .......................... 10 2006 061 687
Dec. 28, 2006 (DE) .......................... 10 2006 061 694

(51) Int. Cl.
*F01N 3/00* (2006.01)
(52) U.S. Cl. ................. 60/284; 60/274; 60/285; 60/286; 123/406.23; 123/430

(58) Field of Classification Search .................... 60/274, 60/284, 285, 286; 123/198 F, 406.23, 430
See application file for complete search history.

(56) References Cited

U.S. PATENT DOCUMENTS
5,845,492 A 12/1998 Isobe et al.
(Continued)

FOREIGN PATENT DOCUMENTS
JP 2000-54837 2/2000
(Continued)

*Primary Examiner* — Binh Q Tran
(74) *Attorney, Agent, or Firm* — Merchant & Gould P.C.

(57) ABSTRACT

An internal combustion engine is operated with direct fuel injection into the combustion chambers. Furthermore, the internal combustion engine is operated with sub-optimum ignition angle efficiency and an apportionment of a fuel quantity, which is to be injected before the start of a combustion, into at least two partial injections. A torque loss which results from the sub-optimum ignition angle efficiency and/or from the apportionment of the fuel to be injected is compensated by means of an increased charge of the combustion chambers. The fuel quantity and the charge are coordinated with one another in such a way that the air ratio lambda of the combustion chamber charges is greater than 1. The method is characterized in that a measure for a temperature of the catalytic converter, in particular a measure for the temperature at the inlet of the catalytic converter, is determined and in that a quantity of reducing exhaust-gas constituents is increased by means of at least one intervention into the control of the internal combustion engine if the measure for the temperature exceeds a predetermined temperature threshold value. The approach according to the invention permits rapid heating of the catalytic converter, wherein the hydrocarbon emissions when the catalytic converter is cold are at the same time as low as possible.

17 Claims, 4 Drawing Sheets

U.S. PATENT DOCUMENTS

| | | | |
|---|---|---|---|
| 6,330,796 B1 | 12/2001 | Nishimura et al. | |
| 6,751,948 B2 * | 6/2004 | Takemura et al. | 60/284 |
| 6,868,827 B2 * | 3/2005 | Surnilla | 123/339.11 |
| 7,127,883 B1 * | 10/2006 | Kaneko et al. | 60/295 |
| 7,168,239 B2 * | 1/2007 | Ingram et al. | 60/285 |
| 7,748,362 B2 * | 7/2010 | Whitney et al. | 123/406.23 |
| 7,886,523 B1 * | 2/2011 | Legare | 60/285 |

FOREIGN PATENT DOCUMENTS

| | | |
|---|---|---|
| JP | 2000120471 | 4/2000 |
| WO | WO 02/18763 | 3/2002 |
| WO | WO 02/18764 | 3/2002 |
| WO | WO 2005/100767 | 10/2005 |

\* cited by examiner

METHOD FOR HEATING A CATALYTIC CONVERTER ARRANGED IN AN EXHAUST-GAS REGION OF A COMBUSTION PROCESS, AND DEVICE FOR CARRYING OUT THE METHOD

TECHNICAL FIELD

The invention relates to a method for heating a catalytic converter arranged in an exhaust-gas region of a combustion process, in particular of an internal combustion engine, and a device for carrying out the method according to the class of the independent claims.

BACKGROUND

The internal combustion engine is operated with direct fuel injection, provision being made for a retardation of the ignition angle as well as an apportionment of the fuel injection into at least two partial injections of fuel, which occur before ignition. A torque loss which results from this measure is compensated by means of an increased charge of the combustion chambers. In the case of a cold catalytic converter, which cannot yet convert, provision if need be is made to establish the air ratio lambda >1, i.e. to operate the internal combustion engine with a lean fuel/air mixture, in order to achieve small emissions of untreated exhaust gas by the internal combustion engine.

Such a method and such a control unit are already used in series production. When the catalytic converter is cold, for example after cold starting the internal combustion engine, the strategy pursued with the known method is to produce a heat flow volume in the exhaust gas, which is as large as possible, without changing the power output of the internal combustion engine or the idle speed, which is elevated if need be in the post-starting phase, at approximately 1,200/min.

This is achieved in the most frequently applied method as a result of a first part of the fuel quantity being injected during the intake stroke and a second part of the fuel quantity during the compression stroke. As a result, a stratified fuel distribution occurs in the combustion chamber with a zone, which arises from the injection of the second part, with a comparatively rich and therefore very ignitable fuel/air mixture around the spark plug.

This operation mode of the internal combustion engine can be denoted as a homogeneous split operation mode, "split" referring to the apportionment of the fuel injection.

The charge stratification allows for a very late ignition timing in the range of 10 to 30° of crankshaft rotation after TDC (TDC=top dead center) when the engine rotational speed is stable and the untreated exhaust gas emissions are controllable. The retarded ignition timing leads to a relatively poor ignition angle efficiency, the ratio of the torques produced at the retarded ignition point and at an optimum ignition point being understood here. The torque loss which results from the poor ignition angle efficiency is compensated by means of an increase in the charges of the combustion chambers of the internal combustion engine. Increases in the charges of the combustion chambers up to values, which amount to approximately 75% of the possible maximum charge under normal conditions, occur at the ignition angles, which are implemented. In total a relatively large quantity of exhaust gas arises thereby, whose temperature is relatively high due to the poor ignition angle efficiency, so that a maximum heat flow (enthalpy flow) occurs in the exhaust-gas region.

When heating with a maximization of the exhaust-gas enthalpy, the exhaust-gas region has to be completely heated from the exhaust valve forward up until the catalytic converter. The heating capacity of these components leads, in particular in internal combustion engines with exhaust-gas turbochargers, to large heat losses before the catalytic converter, which impede an effective heating of the catalytic converter. It is additionally problematic with internal combustion engines with exhaust-gas turbochargers, in that during a maximization of the exhaust-gas enthalpy, the exhaust manifold lying in the jetway of the exhaust gases before the turbine of the turbocharger is heated very quickly to temperatures, whereat an additional heating can lead to the destruction of said manifold. This limits the maximization of the exhaust gas enthalpy, which is desired for heating the catalytic converter.

The homogeneous split operation mode of the internal combustion engine previously described can be employed in a post-starting phase with a constant timing of the point of injection times and the ignition points. In conventional engine management systems of internal combustion engines, the post-starting phase then begins after an actuation of the starter if the rotational speed of the internal combustion engine exceeds a rotational speed threshold value, which lies between the starter rotational speed and the rotational speed of the engine at idle, and then lasts over a predetermined time period of normally 20 to 30 seconds. Within this time period, a precatalytic converter disposed close to the catalytic converter normally achieves an operating temperature (light-off temperature), whereat the pollutant conversion, in particular the conversion of hydrocarbons, noticeably starts. According to a usual definition, the light-off temperature corresponds to that temperature, whereat 50% of the undesirable exhaust gas components, which emerge before the catalytic converter and include carbon monoxide (CO) and hydrocarbons (HC), are converted into non-toxic elements like water and carbon dioxide.

In reality, the percentage of pollutant conversion does not rise dramatically, but rises rather gradually. After the start of the pollutant conversion in the precatalytic converter, the measurable concentration of hydrocarbons downstream of the precatalytic converter quickly drops to values near zero. As has been shown in tests, the drop in the hydrocarbon concentration downstream of the precatalytic converter correlates to the light-off temperature being achieved in a central region of the precatalytic converter. The quantity of hydrocarbons emitted into the environment after cold starting the internal combustion engine or, for example, after an overrun fuel cut-off (operation of the internal combustion engine without fuel metering) is for that reason very much dependant on the time span, which is necessary for achieving the operating temperature of the catalytic converter.

SUMMARY

In this context, the task of the invention consists of specifying a method and a device for carrying out the method, which allow for a rapid heating of a catalytic converter.

Provision is made according to the invention for a measure for the temperature of the catalytic converter to be ascertained and for the quantity of reducing exhaust-gas constituents to then be increased by means of an intervention into the open-loop control of the internal combustion engine, if the temperature of the catalytic converter exceeds a predetermined threshold value.

Because of the fact that the internal combustion engine is operated with a lean fuel/air mixture when the catalytic converter is cold and incapable of conversion, untreated exhaust-gas emissions, which are as small as possible, arise from, for example, uncombusted hydrocarbons, which enter into the environment. During this operating state of the internal combustion engine, the heating of the catalytic converter is achieved by means of a degradation of the efficiency of the internal combustion engine.

Only if the predetermined temperature threshold value of the temperature of the catalytic converter is achieved, is the quantity of reducing exhaust-gas constituents increased by means of an intervention into the open-loop control of the internal combustion engine.

It has been shown that the time to achieve the light-off temperature and thereby the quantity of hydrocarbons emitted into the environment can be reduced by these measures. This advantageous effect might be based on the fact that if the temperature at the inlet of the catalytic converter exceeds the predetermined threshold value, initial catalytically stratified surface elements at the inlet of the catalytic converter already then begin to convert although the temperature in the central region of the catalytic converter is still significantly lower and still far beneath the operating temperature threshold of the catalytic converter.

As a result of the increased supply of reducing exhaust-gas constituents in connection with the oxygen present in the exhaust gas, exothermal reactions arise on these surface elements, which contribute to a direct, immediate and therefore accelerated heating of the catalytic converter. With the increase in the quantity of reducing exhaust-gas constituents, which thereby results, as, for example, is continually performed, a continuous increase in the heat released inside the catalytic converter occurs. The accelerated heating of the initial centimeters of the catalytic converter, which results from said increase in heat, is considerably more effective than the heating by means of a constant enthalpy flow from the engine's combustion, i.e. as said flow is utilized in the technical field (and according to the invention before the temperature threshold value has been exceeded). The advantage of the method according to the invention lies in the fact that the enthalpy flow before entering the catalytic converter experiences losses on account of other components being heated-up. Examples of such other components are the exhaust manifold, turbocharger etc.

A significant, further advantage of the procedural approach according to the invention arises from the fact that beside the reduction in emissions of uncombusted, reducing exhaust-gas constituents, a reduction in the nitric oxide emissions also occurs.

Advantageous modifications and configurations of the procedural approach according to the invention result from the dependent claims.

Provision is made according to one configuration for the quantity of reducing exhaust-gas constituents to be attained by a retraction of the retardation of the ignition timing.

Provision is alternatively or additionally made according to one configuration for the quantity of reducing exhaust-gas constituents to be attained by a change in the apportionment of the fuel quantities specified in the partial injections of fuel prior to ignition.

Furthermore, provision is alternatively or additionally made according to one configuration, for the quantity of reducing exhaust-gas constituents to be attained by a decrease in the air ratio lambda to an air excess, which is smaller than that of the initial starting point.

Moreover, provision can furthermore alternatively or additionally be made for at least one fuel afterinjection after the start of the combustion.

The following advantage arises particularly within the scope of the configuration with at least one fuel afterinjection. The treatment and evaporation of the fuel quantity delivered by the additional injections is considerably improved by maximizing the exhaust-gas enthalpy, so that the probability of the fuel entering the catalytic converter in the form of drops is reduced. The increased exhaust-gas enthalpy as a result of the retarded ignitions and increased charges of the combustion chambers is in fact again reduced by the evaporation of the fuel quantity, which is additionally delivered. With the desired heating of the catalytic converter in mind, this reduction is, however, more than compensated by the more effective heating of the catalytic converter by means of exothermal reactions. With respect to internal combustion engines with exhaust-gas turbochargers, there is the additional advantage of protecting the exhaust manifold from overheating, which can arise when maximizing the exhaust-gas enthalpy without the metering of additional fuel. The additional injection, which is tied to a minimum temperature upstream of the catalytic converter, has in this case the double advantage of the temperature dropping before the turbocharger, which protects the exhaust manifold, and in spite of this of more energy being provided for heating the catalytic converter than is the case without at least one fuel afterinjection.

The device according to the invention for carrying out the method initially relates to a specially designed control unit, which contains means for carrying out the method.

The control unit preferably contains at least one electrical memory, wherein the steps according to the invention are deposited as a control unit program.

Provision is made in the control unit program according to the invention for all steps of the method according to the invention to be carried out, if it is run in a control unit.

The control unit program product according to the invention with a program code stored on a machine-readable carrier executes the method according to the invention if the program runs in a control unit.

Additional advantageous modifications and configurations of the procedural approach according to the invention result from additional dependant claims. Embodiments of the invention are depicted in the drawing and explained in detail in the subsequent description.

DETAILED DESCRIPTION

Figure 1:
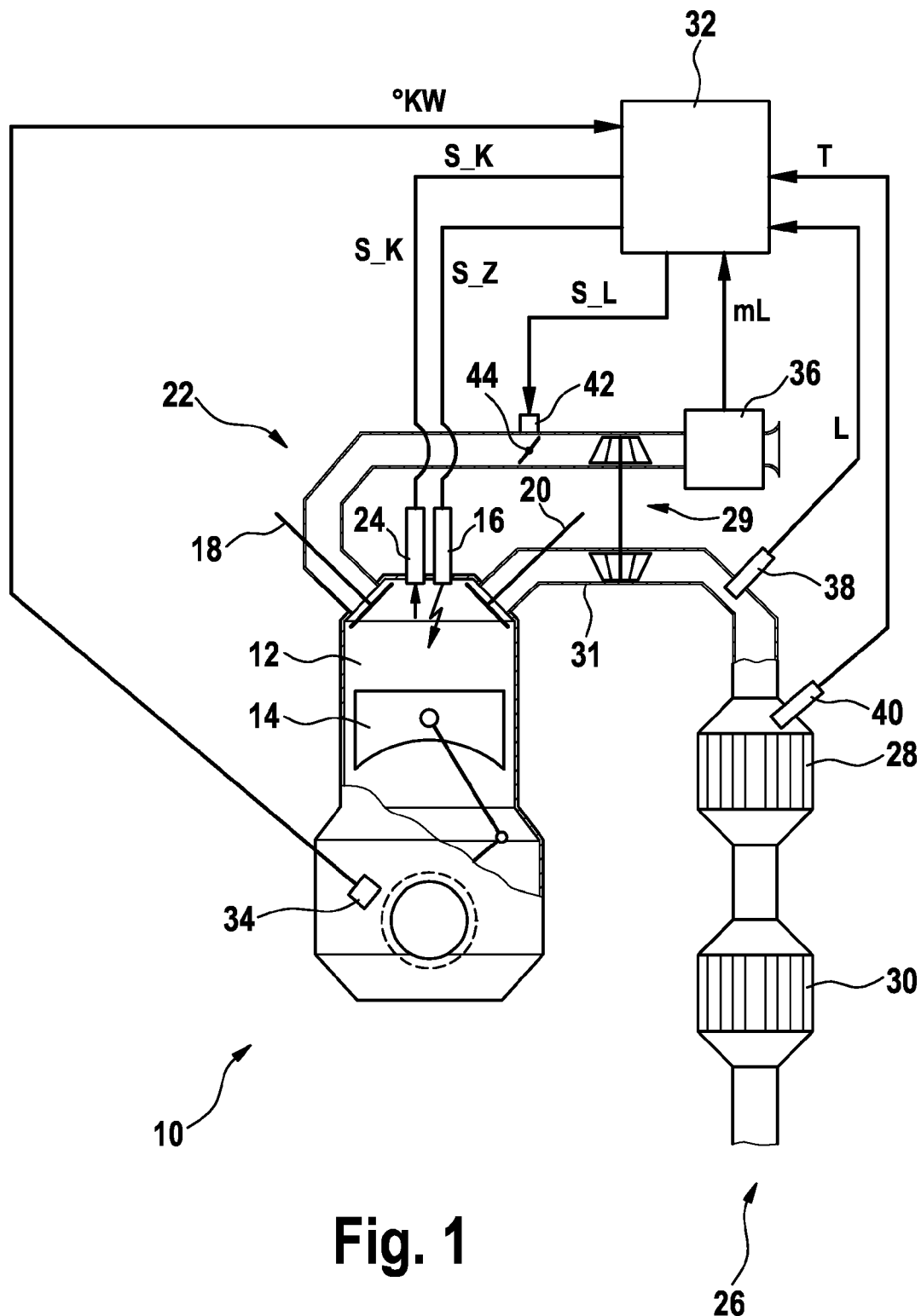
FIG. 1 shows a technical environment, wherein a method according to the invention is operating.

FIG. 1 shows in detail an internal combustion engine 10 with at least one combustion chamber 12, which is movably sealed off by a piston 14. Charges of the combustion chamber 12 with a mixture of fuel and air are ignited by a spark plug 16 and subsequently combusted. In a preferred configuration, the internal combustion engine 10 is optimized for a spray-form combustion process. The manner in which the mixture is formed and the energy is converted in the combustion chamber is denoted as the combustion process. The spray-form combustion process is thereby characterized, in that the fuel is injected in the immediate proximity of the spark plug and is evaporated there. That requires an exact positioning of the spark plug 16 and the fuel injector as well as a precise spray alignment in order to be able to ignite the mixture at the correct point in time. A charge transfer in the combustion chamber is controlled by the gas exchange valves 18 and 20, which are phase-synchronously opened and closed with the movement of the piston 14. The different possibilities for actuating the gas exchange valves 18 and 20 are known to the specialist and are not depicted in detail in FIG. 1 for the sake of clarity. When the intake valve 18 is open and the piston 14 is moving downwards, i.e. during the intake stroke, air flows from an air intake system 22 into the combustion chamber 12. In the combustion chamber 12, fuel is metered to the air via an injector 24. The exhaust gas resulting from the combustion of the charges in the combustion chamber is discharged into an exhaust-gas system 26 when the exhaust valve 20 is open, said exhaust-gas system 26 having at least one catalytic converter 28, which is at least partially configured in such a way that the catalytic converter 28 catalytically supports an oxidation reaction of oxygen with the reducing constituents in the exhaust gas. The exhaust-gas system 26 will generally contain a plurality of catalytic converters, for example: a precatalytic converter, which is installed close to the engine, in the depicted embodiment the catalytic converter 28, and an additional catalytic converter 30, which is disposed away from the engine and, for example, can be a 3-way catalytic converter or a NOx storage catalytic converter.

In the configuration in FIG. 1, the internal combustion engine 10 has a turbocharger 29, which is disposed between an exhaust manifold 31 and the catalytic converter 28 in the jetway of the exhaust gases. As was previously mentioned, special advantages result in regard to such an internal combustion engine by means of the connection between a protection of the exhaust manifold with the accelerated heating of the catalytic converter 28. It should, however, be understood that the invention is not limited to use with internal combustion engines with turbochargers because the advantage of the accelerated heating of the catalytic converter 28 also arises in internal combustion engines 10 without exhaust gas turbochargers 29.

The internal combustion engine 10, respectively the combustion in the internal combustion engine 10, is controlled by a control unit 32, which processes signals of different sensors, wherein operating parameters of the internal combustion engine 10 are delineated, for the purpose of said control. In the open embodiment of FIG. 1, said sensors are an engine rotational speed sensor 34, which acquires an angular position ° KW of a crankshaft of the internal combustion engine 10 and in so doing a position of the piston 14, an air flow meter 36, which acquires an air mass mL flowing into the internal combustion engine 10, and optionally one or a plurality of exhaust-gas sensors 38, 40, which acquire a concentration of an exhaust-gas constituent and/or a temperature T of the exhaust gas.

In the configuration of FIG. 1, the exhaust gas sensor 38 is a lambda sensor, which acquires an oxygen concentration in the exhaust gas as the measure for an air ratio L (L=lambda), while the sensor 40 acquires an exhaust-gas temperature T. In the depicted embodiment, the sensor 40 acquires the exhaust-gas temperature T at the inlet of the catalytic converter 28. The air ratio lambda is, as is well known, defined as the quotient of an air mass actually available in the numerator and an air mass required for a stoichiometric combustion of a specific fuel mass in the denominator. Air numbers lambda greater than one therefore represent an excess air, whereas air ratios lambda smaller than one represent a fuel excess. Provided that the exhaust-gas system 26 has an exhaust-gas temperature sensor 40, said sensor 40 can also be disposed at another location in the exhaust-gas system 26, for example, at the inlet of the additional catalytic converter 30. This is especially true in the event that the additional catalytic converter 30 is a NOx storage catalytic converter.

It is essential to the invention that a measure for the temperature T of the catalytic converter 28, 30, preferably a measure for the temperature at the inlet of the catalytic converter 28, 30 is ascertained. The ascertainment can in one configuration, as it is depicted in FIG. 1, take place by measuring with the temperature sensor 40. In the embodiment depicted in FIG. 1, the temperature sensor 40 acquires the exhaust-gas temperature in particular at the inlet of the catalytic converter 28, 30 as the measure for the temperature. The measure for the temperature T of the catalytic converter 28, 30 can alternatively or additionally be ascertained from at least one operating parameter of the internal combustion engine 10 by means of a mathematical model in the control unit 32 using relationships deposited in the control unit 32. If the temperature sensor 40 is disposed at another location in the exhaust-gas system 26, the measure for the temperature T of the catalytic converter 28, 30, in particular at the inlet of the catalytic converter 28, 30, can be ascertained from a mathematical model. Said measurement is adapted to the temperature measured at another location in the exhaust gas system 26. A mathematical model can also analogously serve the purpose of correcting the signal of the temperature sensor 40. This configuration is particularly practical when there are rapid changes in temperature, particularly in the exhaust gas. Said changes can be better taken into account by a mathematical model due to the inertia of the temperature sensor 40.

From the signals of these and if need be additional sensors, the control unit 32 constructs control signals for the activation of actuators for the open-loop control of the internal combustion engine. In the configuration of FIG. 1, said control signals are especially a control signal S_L for the activation of a throttle positioner 42, which adjusts the angular position of a throttle valve 44 in the air intake system 22, a signal S_K, with which the control unit 32 activates the injector 24 and a control signal S_Z, with which the control unit 32 activates the spark plug 16, respectively an ignition device 16.

Moreover, the control unit 32 is set up for the purpose, in particular programmed for the purpose, of carrying out the method presented here and/or one of its configurations and/or of controlling a corresponding process according to the invention, the program being deposited in at least one memory, which is not specified in detail in FIG. 1.

In a preferred configuration, the control unit 32 converts power demands to the internal combustion engine 10 into a nominal value for the total torque to be produced by the internal combustion engine 10 and divides this torque into torque components, which are influenced by the control signals S_L for the cylinder-charge control, S_K for the fuel metering and S_Z for the ignition control. The cylinder-charge component is adjusted by means of an appropriate setting of the throttle valve 42 with the control signal S_L. The fuel component is adjusted with the actuating variable S_K essentially by means of the manner of apportionment of the fuel mass to be injected into one or a plurality of partial injections as well as by the relative position of the partial injections with respect to each other and to the movement of the piston 14, i.e. by means of the injection timing. The maximum possible torque at a given charge of air comes about at the optimum air ratio lambda, the optimum injection timing and the optimum ignition angle.

Figure 2A:
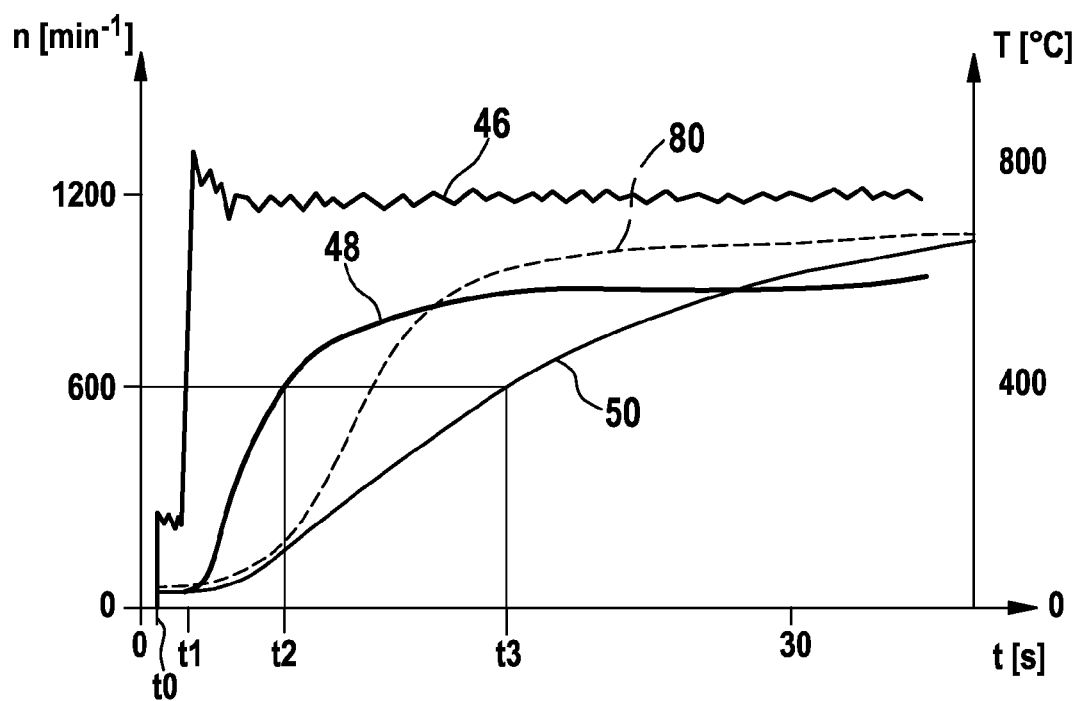
FIGS. 2a and 2b show temporally correlated progressions of engine rotational speeds and temperatures and hydrocarbon concentrations in the exhaust gas, as they appear in the known strategy and in the subject matter of the invention.

Prior to discussing the example of embodiment of a method according to the invention, which is stated below, the situation of the known method is initially depicted with reference to FIG. 2. FIG. 2a shows in detail among other things temporally correlated progressions 46, 48 and 50 of the rotational speed n of the internal combustion engine 10 (progression 46), the temperature T of the catalytic converter 28, 30, in particular the temperature T at the inlet of the catalytic converter 28, 30, specifically the exhaust-gas temperature T at the inlet of the catalytic converter 28, 30 (progression 48) and the temperature in a central region of the catalytic converter 28, 30 (progression 50) after, for example, cold starting the internal combustion engine 10 in a post-starting phase or, for example, after an overrun fuel-cutoff of the internal combustion engine 10, wherein the fuel supply is disconnected. In so doing, the temporal progressions 48, 50 depicted in FIG. 2 have been plotted for the implementation of the known method, which is based on an increase in the heat flow in the exhaust gas.

A starter accelerates the internal combustion engine 10 to a starter rotational speed of slightly over 200 rpm at the point in time t0. The rotational speed n of the internal combustion engine 10 increases with the onset of combustions in the combustion chambers 12 and exceeds an end of start-up-rotational speed threshold value of approximately 400 rpm at the point in time t1. It subsequently levels out rapidly at an elevated idling speed of approximately 1,200 rpm. The post-starting phase begins with the end of start-up-rotational speed threshold value having been exceeded at the point in time t1. In order to provide a large heat flow in the exhaust gas during this post-starting phase, the control unit 30 emits sub-optimum ignition angles via the actuating variable S_Z On account of the thereby reduced ignition angle efficiency, said sub-optimum ignition angles lead to a torque loss, which is induced by (compensated by) an increased charge of the combustion chambers 12 by the control signals S_L. On account of the additional influence of the fuel control signals S_K, an air ratio lambda in total is set in the hyperstoichiometric range, i.e. an air ratio lambda greater than 1, for example L=1.1

This is especially important in a phase, wherein the catalytic converter 28, 30 cannot reduce the hydrocarbons or can reduce them only to a small extent, so that the only possibility for limiting the hydrocarbon emissions entering into the surrounding environment consists of curtailing the untreated emissions of the internal combustion engine 10. This curtailment results as a desired consequence of operating the engine with an air ratio lambda L greater than one.

As a result of the increased cylinder charge, a large quantity of exhaust gas is produced, which furthermore has a relatively high temperature and an oxygen excess due to the sub-optimum ignition angle efficiency. Altogether a larger heat or enthalpy flow is thereby produced. As a result, the temperature T, in particular in the inlet region of the catalytic converter 28, 30 increases relatively quickly, which is reflected in the relatively steep ascent in the progression 48. As a result, an exhaust-gas temperature of, for example, 400° Celsius is already achieved at the inlet of the catalytic converter 28, 30 at the point in time t2. The temperature of the central region of the catalytic converter 28, 30, which is depicted in progression 50, achieves the temperature value of, for example, 400° Celsius in contrast first at a later point in time t3, which is stipulated by the significantly flatter increase in progression 50 in comparison with progression 48. The flatter progression 50 arises on account of the heat capacity of the regions lying in front of the central region of the catalytic converter 28, 30, which during through-flow of the exhaust gas are heated before the central region and remove heat from the exhaust gas. A typical time interval between t2 and t3 lies in the magnitude of 10 seconds.

Figure 2B:
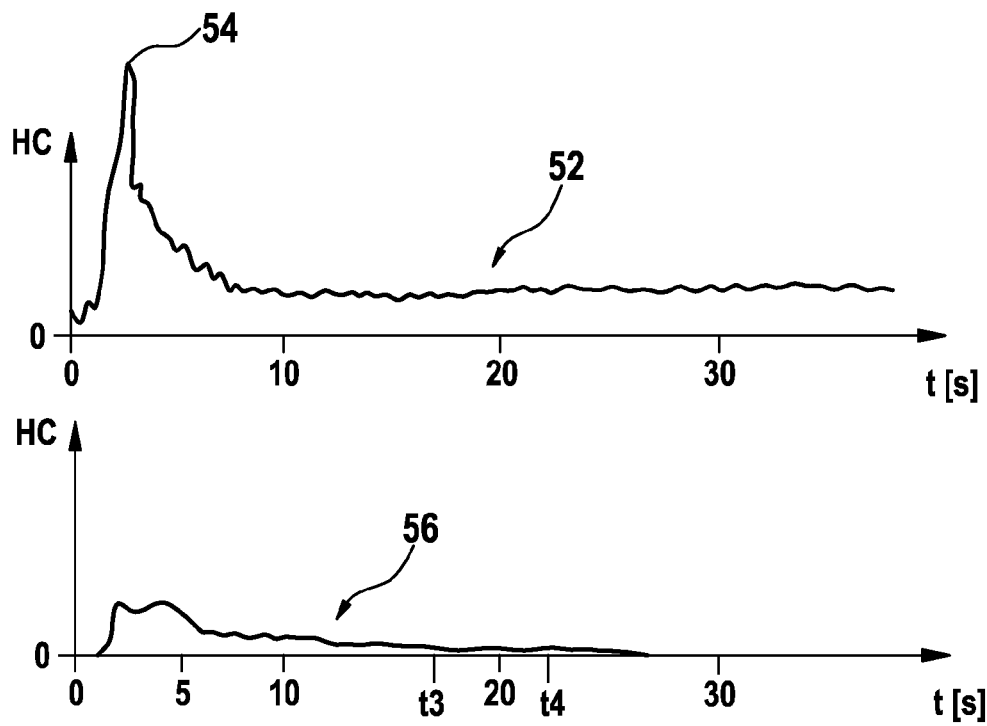

FIG. 2b shows temporally correlating progressions of the hydrocarbon concentration upstream and downstream of the precatalytic converter 28. The progression 52 of the hydrocarbon concentration upstream of the precatalytic converter initially has a sharp maximum, which relates directly to the starting of the internal combustion engine 10 and the initial run-up of the engine rotational speed n to the value of the increased engine idling speed (for example 1,200 rpm). The hydrocarbon concentration subsequently drops upstream of the catalytic converter 28, 30 to a relatively constant value.

In progression 56 of the hydrocarbon concentration downstream of the catalytic converter 28, 30, the sharp maximum 54 of the progression 52 is reflected in a compressed and temporally elongated form. This compression and elongation relates less to a conversion but rather to a certain storage effect of the catalytic converter 28, 30. Afterwards the hydrocarbon concentration downstream of the catalytic converter 28, 30 initially assumes similar values, as they appear upstream of the catalytic converter 28, 30, before they gradually drop to a value in the proximity of zero with the onset of and the gradual increase in the conversion capacity of the catalytic converter 28, 30. This is the case approximately at the point in time t4 shortly after the point in time t3. That means that the almost constant untreated hydrocarbon emissions of the internal combustion 10 are virtually completely converted from the point in time t4 forward by the then operative catalytic converter 28, 30.

The quantity of the hydrocarbons emitted to the environment is proportional to the integral of the hydrocarbon concentration downstream of the precatalytic converter 28. Because hardly any hydrocarbon emissions emerge downstream of the catalytic converter 28, 30 after the point in time t4, the value of the integral at the point in time t4 also dominates the results of exhaust gas tests. In order to improve the results of such tests and thereby reduce the emissions of hydrocarbons into the environment, provision is made in the invention for the conversion, which already deploys at the inlet of the catalytic converter 28, 30 due to the higher exhaust-gas temperatures there, to be used for the more rapid heating of the catalytic converter 28, 30 already prior to the point in time t3, at which in particular the central region of the catalytic converter 28, 30 achieves its operating temperature.

According to one example of embodiment of the procedural approach according to the invention, provision is made for at least one fuel afterinjection after the beginning of the combustion of the fuel in the internal combustion engine 10 if the temperature T, in particular at the inlet of the catalytic converter 28, 30 exceeds a predetermined threshold value T_S. In the example of embodiment shown, it is assumed that this is the case at the point in time t2, the temperature threshold value T_S lying, for example at 400° C.

FIG. 3 shows different injection models, as they occur in the configuration of the method according to the invention with at least the one fuel afterinjection. In so doing, the injection impulse widths ti_1, ti_2, and ti_3 are plotted as high levels above the degrees of crankshaft rotation ° KW of a work cycle consisting of an intake stroke Stroke_1 (Takt_1), a compression stroke Stroke_2 (Takt_2), a power stroke Stroke_3 (Takt_3) and an exhaust stroke Stroke_4 (Takt_4). Top dead centers are denoted by TDC (OT).

Figure 3A:
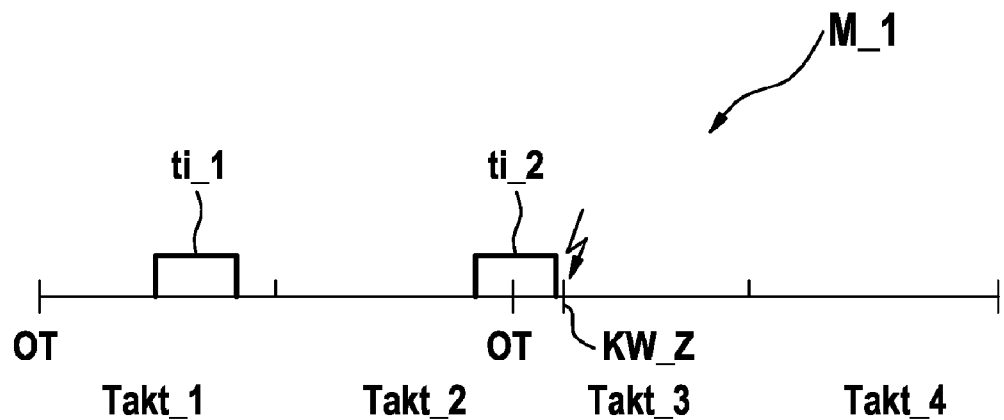
FIGS. 3a and 3b show different fuel injection models.

FIG. 3a shows a first injection model M_1 for a homogeneous split operation mode for maximized exhaust gas enthalpy with a first partial injection ti_1, which takes place during the intake stroke Stroke_1 and a second partial injection ti_2, which takes place later. The second partial injection ti_2 takes place prior to ignition, which is triggered at the crankshaft angle KW_Z. As was already mentioned, KW_Z occurs in certain circumstances very late in the range of 10° to 30° KW after TDC (OT), so that the second partial injection can also entirely or partially occur in the power stroke Stroke_3. Said partial injection occurs, however, before ignition. Instead of an apportionment into two partial injections, the fuel quantity injected with the first injection model M_1 can also be apportioned into more than two partial injections. The possibility of apportionment is limited by the small quantity metering capacity of the injector 24. Apportionment into at least two partial injections is essential for the model M_1. In so doing, the earlier of the said injections preferably takes place during the intake stroke Stroke_1 and the last one takes place during the same power stroke before ignition, in total an air ratio lambda L greater than 1 being thereby yielded.

Figure 3B:
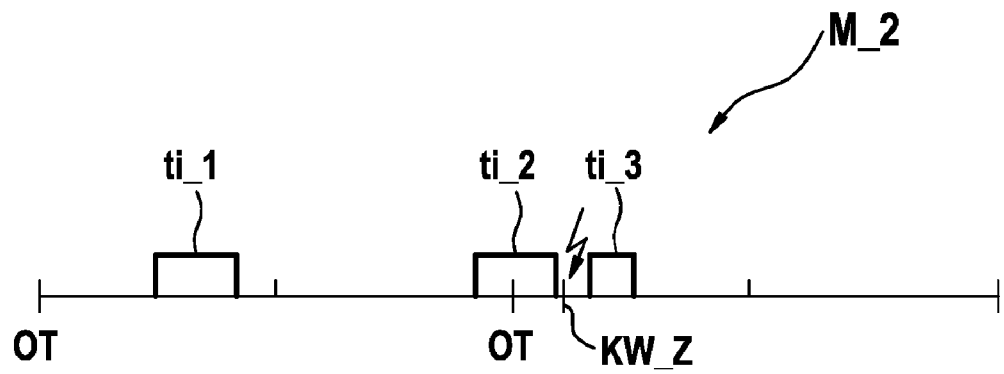

FIG. 3*b* shows a second injection model M_2, which differs from the first injection model M_1 by means of a fuel afterinjection ti_3, which takes place after ignition. The fuel quantity injected with at least the one fuel afterinjection ti3 is therefore at least no longer completely combusted in the combustion chamber 12 and thus enters into the maximized exhaust gas enthalpy flow as an uncombusted fuel quantity. Its evaporation enthalpy somewhat reduces the exhaust gas enthalpy, which, for example, protects the exhaust gas manifold 31 from overheating. The evaporated fuel quantity is transported with the exhaust gas flow into the catalytic converter 28, 30 and contributes there to the desired heat release by means of exothermal reaction with oxygen from the exhaust gas, which furthermore is hyperstoichiometrically composed. In a preferred configuration, the entire fuel quantity injected with the injection model M_2 is measured in such a way that an air ratio lambda L is yielded upstream of the catalytic converter, which is smaller by 1 to 3% than the air ratio lambda L in the injection model M_1.

Figure 4:
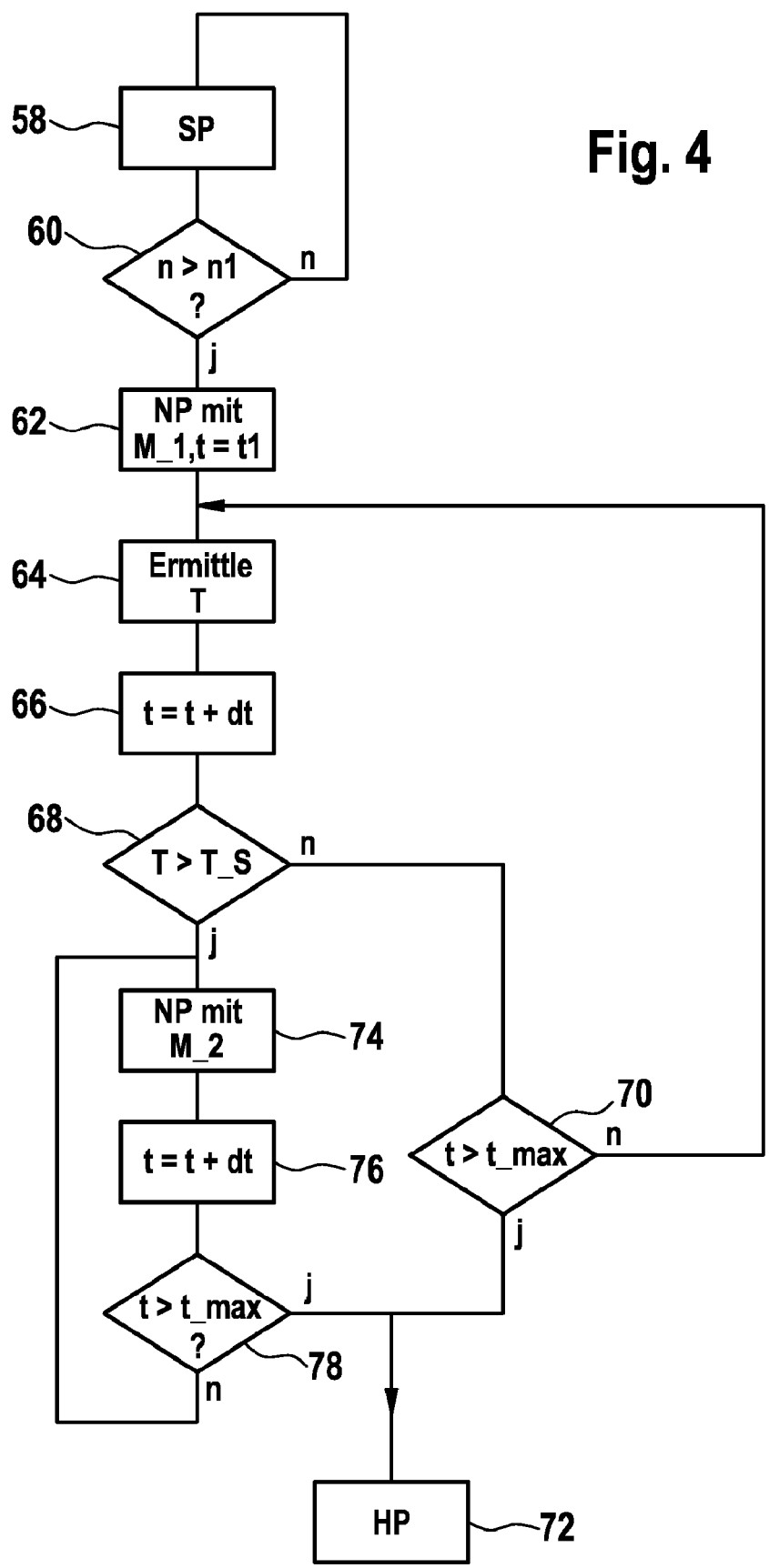
FIG. 4 is a flow diagram as an example of embodiment of a method according to the invention.

FIG. 4 shows a flow diagram as an example of embodiment of a method according to the invention. In Step 58, a starting program SP is executed when a starter is actuated. The actuating variables S_L, S_K and S_Z, with which the internal combustion engine 10 can be started when the starter has been activated, are emitted in said program SP. A test is made in Step 60 to determine whether the rotational speed n of the internal combustion engine 10 exceeds the end of start-up-engine rotational speed n1. As long as that is not the case, the program branches back to Step 58, wherein the starting program SP continues to be executed.

As soon as the end of start-up-engine rotational speed n1 has been exceeded, the program branches out to Step 62, wherein the operating sequence of a post-starting program NP for the open-loop control of the internal combustion engine 10 at idle is triggered and wherein a time variable t is set to the value t1, whereat the end of start-up-engine rotational speed threshold value n1 has been exceeded. The operation with the post-starting program is in so doing, in particular thereby, characterized, in that initially a large enthalpy flow in the exhaust gas is produced in connection with the smallest possible untreated emissions of uncombusted, reducing exhaust-gas constituents, such as HC and CO. The enthalpy flow is preferably increased by an operation with a reduced ignition angle efficiency and an apportionment of a fuel quantity, which is to be injected for each combustion chamber charge, into a first injection during the intake stroke and a second injection during the compression stroke in connection with an increased air charge in the combustion chambers 12. In other words: an operating sequence of the post-starting program is triggered with an injection model M_1, as was described in connection with FIG. 3.

In so doing, the apportionment of the fuel quantity to be injected into two injections offers the possibility of relatively drastically reducing the ignition angle efficiency because of the fact that the ignition is displaced as far as ranges of 10° to 30° of crankshaft rotation after TDC (OT), which allows for a corresponding increase in the air charge to compensate the torque loss. In order to keep the untreated emissions of uncombusted and reducing exhaust-gas constituents as small as possible, the air ratio lambda L is set to lambda values greater than one, for example lambda=1.1, at the beginning of the post-starting operation NP. This operation represents the homogeneous split operation already mentioned earlier in the application.

During the course of further processing the post-starting program NP, the measure for the temperature T of the catalytic converter 28, 30, in particular the measure for the temperature T at the inlet of the catalytic converter 28, 30, is ascertained in Step 64. As was already mentioned, ascertaining said measurement can take place by measuring and/or by means of a model.

An increase in the time variables t by an increment dt takes place in Step 66. The measure for the temperature T, which was ascertained in Step 64, is compared with the temperature threshold value T_S in Step 68. As long as the measure for the temperature T is smaller than the temperature threshold value T_S, it is assumed that the initial catalytic surface elements at the inlet of the catalytic converter 28, 30 also still cannot convert any reducing exhaust-gas constituents. The query in Step 68 is accordingly answered in the negative, and the program then branches out to Step 70, wherein a test is made to determine whether a maximum duration t_max of the post-starting phase has been achieved. A typical value for the maximum duration t_max lies approximately between 20 s and 30 s.

If the query in Step 70 is answered in the affirmative, the program branches out to Step 72, wherein a main program HP for the open-loop control of the internal combustion engine 10 is implemented. The main program HP differs from the post-starting program in particular because of the fact that the internal combustion engine 10 is no longer operated with the maximized enthalpy flow in the exhaust gas.

If the query in Step 70 will, however, be answered in the negative at the beginning of the post-starting phase, the program branches back to a location before Steps 64 and 66, wherein the measure for the temperature T is again ascertained and the time variable t is increased by an additional increment dt. In this manner, the process repeatedly passes through the loop of Steps 64 to 70 until the termination condition in Step 68 or the termination condition in Step 70 is met. That particularly means that after a normal cold starting, the internal combustion engine 10 is operated in the post-starting program NP with a large enthalpy flow and simultaneously with hydrocarbon emissions, which are as small as possible, up until the query in Step 68 is answered in the affirmative. The time elapsed since the end of start-up can also be used as a measure for the temperature T. In a further configuration, this time can be used as a measure for the temperature after a weighting with a temperature of the internal combustion engine 10 shortly before, during or shortly after the start-up. The smaller this temperature is, the smaller is the weighting factor to be selected.

According to another configuration, the method according to the invention can be implemented independent of a start-up of the internal combustion engine. Besides during cold starting of the internal combustion engine 10, a cooling of the catalytic converter 28, can occur during an operation of the internal combustion engine 10 within the scope of an overrun fuel-cutoff, wherein the fuel supply is disconnected, so that a renewed heating of the catalytic converter 28, 30 is required. In this case, the method described in the context of the engine start-up is omitted, and the method according to the invention is primarily temperature controlled; and in so doing, provision is made for a check of the measure for the temperature T to determine whether the temperature threshold value T_S has been exceeded or undershot. Besides the open-loop control of the temperature, additional parameters, as, for example, a characteristic value for the overrun fuel-cutoff, can be taken into account.

The query in Step 68 is answered in the affirmative if the measure for the temperature T exceeds the temperature threshold value T_S. In a preferred configuration, the threshold value T_S is predetermined in such a way that it corresponds to a temperature, whereat the initial surface elements of the catalytic converter 28, 30 begin to a noticeable extent with the conversion of reducing exhaust-gas constituents by catalytically triggering exothermal reactions with the oxygen supply in the exhaust gas. In order to substantially utilize the heat of reaction released by these exothermal reactions for the accelerated heating of the catalytic converter 28, 30, an operation of the internal combustion engine 10 is activated in Step 74, wherein at least one additional fuel afterinjection occurs after the start of the combustion. For that reason, the post-starting program NP takes place with an injection model M_2, as it was explained in connection with FIG. 3.

In addition to or as an alternative to at least the one fuel afterinjection, other measures for increasing the quantity of reducing exhaust-gas constituents can be performed by an intervention into the open-loop control of the internal combustion engine 10.

Provision is, for example, additionally or alternatively made for reducing the retardation of the ignition angle, i.e. to slightly increase the ignition angle efficiency.

Provision is, for example, additionally or alternatively made for varying the apportionment of the fuel quantities to be metered in the individual fuel partial injections.

Furthermore, provision is, for example, additionally or alternatively made for setting the air ratio lambda L somewhat less lean.

Which of these measures individually or in connection with other measures deploys the greatest effect depends on the configuration of the internal combustion engine 10. The individual measures or the group of measures are therefore to be identified through tests and programmed accordingly.

A continuous reduction of the air ratio lambda L by 1 to 3%, for example from lambda L=1.1 to lambda L=1.08, during the implementation of the method after an affirmative answer in Step 68 is considered to be a particularly suitable measure.

A reduction in the retardation of the ignition angle likewise gives rise to an increase in the HC untreated emissions. It has, for example, been shown during tests on an internal combustion engine 10 that a reduction in the retardation of the ignition angle can lead to an increase in the HC untreated emissions by approximately 3%. With this measure, a drop in the exhaust-gas temperature has to be tolerated if need be.

The air ratio lambda can thereby be increased, in that the entire fuel quantity, which is injected with the two fuel partial injections, is increased. Alternatively the apportionment of the fuel quantity to be metered in the individual fuel partial injections can be altered.

Step 76, wherein the time variable t is increased by the increment dt, follows Step 74. Analogous to the query in Step 70, a test is made in Step 78 to determine whether the time variable t exceeds the threshold value t_max after several increases by the increment dt. As long as that is not the case, the query in Step 78 is answered in the negative, and the program returns to Step 74, wherein the operation is continued with the second injection model M_2. In one configuration, the fuel quantity injected with the additional partial injection ti_3 is successively increased in the process and thereby adapted to the capacity for conversion, which progresses into the depth of the catalytic converter 28, 30 with an increase in the heating. In one configuration, the increase in the emission of uncombusted exhaust-gas constituents resulting from at least one fuel afterinjection ti_3 is concluded if the time threshold value t_max is exceeded in Step 78. In this case, the post-starting phase or generally speaking the method according to the invention is concluded and the program branches out to Step 72, wherein the main program, which was already mentioned, for the open-loop control of the internal combustion engine 10 is implemented without an increased enthalpy flow in the exhaust gas.

The progression 80 in FIG. 2a plotted with a dashed line qualitatively delineates the effect of the invention. The progression 80 plotted with a dashed line shows, as the progression 50 also does, the temporal progression of the temperature T in a central region of the catalytic converter 28, 30 in the post-starting phase, respectively in the normal catalytic converter heating operation. As can be seen from FIG. 2a, the curves 50 and 80 run parallel, respectively identically, up to the point in time t2. This lies in the fact that no difference to the known method arises up to the point in time t2. That particularly means that according to the invention, the internal combustion engine 10 is operated at the beginning of the post-starting phase, respectively at the beginning of the catalytic converter heating measure, with an increased enthalpy flow while the untreated emissions of uncombusted exhaust-gas constituents are at the same time reduced extensively as possible. A difference between the progression 50, which occurs during the known method, and the progression 80, which occurs according to the invention, arises after the point in time t2, at which the temperature T achieves the temperature threshold value T_S. In one configuration, this temperature threshold value T_S lies, for example, between 380° Celsius and 420° Celsius. The value depends to a great degree on the catalytic converter 28, 30. For times t>t2, the untreated emission of uncombusted hydrocarbons, which is increased within the scope of the invention, in connection with the onset of the conversion capacity at least at the inlet of the catalytic converter 28, 30 causes an exothermal reaction with the oxygen supply in the exhaust gas. Said reaction heats the catalytic converter 28, 30 more effectively than is possible solely with the increased enthalpy flow. As a result, the progression 80 delineated with a dashed line, which occurs in the method according to the invention, increases more rapidly than the progression 50, which occurs with the known method.

As becomes apparent in FIG. 2a, a relatively large difference exists between the progression 48 of the temperature upstream of the catalytic converter 28, 30 and the progression 50 of the temperature in the central region of the catalytic converter 28, 30, which is attained with the known method. As was previously mentioned, this difference, respectively the temporal distance between a point in time, whereat the measure for the temperature T of the catalytic converter 28, 30, in particular at the inlet of the catalytic converter 28, 30, achieves the determined temperature threshold value T_S, and the point in time, whereat the temperature in the central region of the catalytic converter 28, 30 achieves this temperature, is responsible for the largest portion of the hydrocarbon emissions entering into the environment when the catalytic converter 28, 30 is cold. A comparison of the curve 80 delineated with a dashed line, which was attained with the method according to the invention, with the curve 48, which reflects the progression of the temperature T, in particular at the inlet of the catalytic converter 28, 30, shows that this difference turns out significantly smaller in the method according to the invention than in the known method. This takes effect by directly reducing the hydrocarbon emissions into the environment even when the catalytic converter 29, 30 is still cold.

The invention claimed is:

1. A method of heating a catalytic converter arranged in an exhaust-gas region of an internal combustion engine operated with direct fuel injection into combustion chambers, the method comprising:
    operating the internal combustion engine with a sub-optimum ignition angle efficiency and an apportionment of a fuel quantity that is to be injected before a start of a combustion into at least two partial injections;
    compensating for a torque loss that results from the sub-optimum ignition angle efficiency and from the apportionment of the fuel to be injected by an increased charge of the combustion chambers;
    coordinating the fuel quantity and the charge with one another to produce an air ratio lambda of the combustion chamber charges that is greater than 1;
    ascertaining a measure for a temperature of the catalytic converter; and
    increasing a quantity of reducing exhaust-gas constituents by at least one intervention into an open-loop control of the internal combustion engine if the measure for the temperature of the catalytic converter exceeds a predetermined temperature threshold value.

2. The method according to claim 1, further comprising performing at least one fuel afterinjection after the start of the combustion in order to increase the quantity of reducing exhaust-gas constituents.

3. The method according to claim 1, further comprising performing a return of the ignition angle efficiency to a less unfavorable ignition angle efficiency in order to increase the quantity of reducing exhaust-gas constituents.

4. The method according to claim 1, further comprising altering the apportionment of the fuel quantity to be injected in the at least two partial injections in order to increase the quantity of reducing exhaust-gas constituents.

5. The method according to claim 1, further comprising altering the air ratio lambda to a less lean air ratio lambda in order to increase the quantity of reducing exhaust-gas constituents.

6. The method according to claim 1, further comprising the measure for the temperature of the catalytic converter at an inlet of the catalytic converter.

7. The method according to claim 6, further comprising ascertaining an exhaust-gas temperature upstream of the catalytic converter as the measure for the temperature at the inlet of the catalytic converter.

8. The method according to claim 1, further comprising ascertaining the measure for the temperature of the catalytic converter with an exhaust-gas temperature model from operating parameters of the internal combustion engine.

9. The method according to claim 8, further comprising ascertaining the measure for the temperature of the catalytic converter as an alternative to or in addition to an ascertainment by an exhaust-gas temperature model from a signal of a temperature sensor.

10. The method according to claim 1, further comprising using a time elapsed since an end of start-up of the internal combustion engine as the measure for the temperature of the catalytic converter.

11. The method according to claim 1, further comprising implementing said method only during a time span of less than 30 seconds after an end of the start-up of the internal combustion engine.

12. The method according to claim 1, further comprising setting the air ratio lambda in the exhaust gas upstream of the catalytic converter to a value greater than 1, wherein the increase in the quantity of reducing exhaust-gas constituents is measured such that the air ratio lambda is reduced by 1 to 3%.

13. The method according to claim 1, further comprising continually increasing the quantity of reducing exhaust-gas constituents.

14. The method according to claim 1, further comprising predetermining the threshold value such that the catalytic converter begins to catalytically support oxidation reactions between reducing and oxidizing exhaust-gas constituents at the threshold value.

15. A device, especially a control unit, configured to implement a method of heating a catalytic converter arranged in an exhaust-gas region of an internal combustion engine operated with direct fuel injection into combustion chambers, the method comprising: operating the internal combustion engine with a sub-optimum ignition angle efficiency and an apportionment of a fuel quantity that is to be injected before a start of a combustion into at least two partial injections; compensating for a torque loss that results from the sub-optimum ignition angle efficiency and from the apportionment of the fuel to be injected by an increased charge of the combustion chambers; coordinating the fuel quantity and the charge with one another to produce an air ratio lambda of the combustion chamber charges that is greater than 1; ascertaining a measure for a temperature of the catalytic converter; and increasing a quantity of reducing exhaust-gas constituents by at least one intervention into an open-loop control of the internal combustion engine if the measure for the temperature of the catalytic converter exceeds a predetermined temperature threshold value.

16. A control unit program that executes all steps of a method, if run in a control unit, of heating a catalytic converter arranged in an exhaust-gas region of an internal combustion engine operated with direct fuel injection into combustion chambers, the method comprising: operating the internal combustion engine with a sub-optimum ignition angle efficiency and an apportionment of a fuel quantity that is to be injected before a start of a combustion into at least two partial injections; compensating for a torque loss that results from the sub-optimum ignition angle efficiency and from the apportionment of the fuel to be injected by an increased charge of the combustion chambers; coordinating the fuel quantity and the charge with one another to produce an air ratio lambda of the combustion chamber charges that is greater than 1; ascertaining a measure for a temperature of the catalytic converter; and increasing a quantity of reducing exhaust-gas constituents by at least one intervention into an open-loop control of the internal combustion engine if the measure for the temperature of the catalytic converter exceeds a predetermined temperature threshold value.

17. A control unit program product with a program code that is stored on a machine-readable carrier to implement, if the program product runs in a control unit, a method of heating a catalytic converter arranged in an exhaust-gas region of an internal combustion engine operated with direct fuel injection into combustion chambers, the method comprising: operating the internal combustion engine with a sub-optimum ignition angle efficiency and an apportionment of a fuel quantity that is to be injected before a start of a combustion into at least two partial injections; compensating for a torque loss that results from the sub-optimum ignition angle efficiency and from the apportionment of the fuel to be injected by an increased charge of the combustion chambers; coordinating the fuel quantity and the charge with one another to produce an air ratio lambda of the combustion chamber charges that is greater than 1; ascertaining a measure for a temperature of the catalytic converter; and increasing a quantity of reducing exhaust-gas constituents by at least one intervention into an open-loop control of the internal combustion engine if the measure for the temperature of the catalytic converter exceeds a predetermined temperature threshold value.

* * * * *